US010227070B2

(12) United States Patent
Höck et al.

(10) Patent No.: US 10,227,070 B2
(45) Date of Patent: Mar. 12, 2019

(54) DRIVELINE TORQUE CONTROL (71) Applicant: GKN Automotive Ltd., Redditch, Worcestershire (GB)

(72) Inventors: Michael Höck, Neunkirchen-Seelscheid (DE); Harwin Niessen, Hürth (DE); Juan Manuel Micó Soler, Köln (DE)

(73) Assignee: GKN Automotive Ltd., Redditch, Worcestershire (GB)

( * ) Notice: Subject to any disclaimer, the term of this patent is extended or adjusted under 35 U.S.C. 154(b) by 0 days.

(21) Appl. No.: 15/771,434

(22) PCT Filed: Nov. 2, 2016

(86) PCT No.: PCT/EP2016/076348
§ 371 (c)(1),
(2) Date: Apr. 27, 2018

(87) PCT Pub. No.: WO2017/076862
PCT Pub. Date: May 11, 2017

(65) Prior Publication Data
US 2018/0339698 A1 Nov. 29, 2018

(30) Foreign Application Priority Data

Nov. 2, 2015 (DE) .................. 10 2015 118 759

(51) Int. Cl.
*B60K 6/48* (2007.10)
*B60K 6/52* (2007.10)
(Continued)

(52) U.S. Cl.
CPC .............. *B60W 30/045* (2013.01); *B60K 6/48* (2013.01); *B60K 6/52* (2013.01); *B60W 10/02* (2013.01);
(Continued)

(58) Field of Classification Search
CPC .... B60W 30/045; B60W 20/00; B60W 10/08; B60W 10/02; B60W 2520/28;
(Continued)

(56) References Cited

U.S. PATENT DOCUMENTS 7,828,684 B2 * 11/2010 Whitmarsh ......... F16H 61/2807
475/120
2005/0003923 A1 1/2005 Ishikawa
(Continued)

FOREIGN PATENT DOCUMENTS

DE 101 35 436 A1 1/2002
DE 10151713 A1 7/2002
(Continued)

OTHER PUBLICATIONS

International Search Report and Written Opinion for PCT/EP2016/076348 dated Jan. 27, 2017 (with English translation; 13 pages).
(Continued)

*Primary Examiner* — Michael J Zanelli
(74) *Attorney, Agent, or Firm* — Bejin Bieneman PLC (57) ABSTRACT Controlling a driving torque of a driveline assembly of a motor vehicle comprises: monitoring a speed of a first drive axle; monitoring a speed of a second drive axle; determining a target speed for the electric machine from at least one of the speeds of the first and the second drive axle controlling the electric machine in target speed mode as a function of the at least one speed; determining a target torque from the speed of the first drive axle and the speed of the second drive axle; controlling the clutch in a target torque mode as a function of the speed of the first drive axle and the speed of the second drive axle.

15 Claims, 4 Drawing Sheets (51) Int. Cl.
*B60W 10/02* (2006.01)
*B60W 10/08* (2006.01)
*B60W 20/00* (2016.01)
*B60W 30/18* (2012.01)
*F16H 48/36* (2012.01)
*B60W 30/045* (2012.01)

(52) U.S. Cl.
CPC ............ *B60W 10/08* (2013.01); *B60W 20/00* (2013.01); *B60W 30/18072* (2013.01); *F16H 48/36* (2013.01); *B60W 2030/18081* (2013.01); *B60W 2510/081* (2013.01); *B60W 2510/083* (2013.01); *B60W 2520/125* (2013.01); *B60W 2520/263* (2013.01); *B60W 2520/28* (2013.01); *B60W 2540/10* (2013.01); *B60W 2540/18* (2013.01); *B60W 2710/027* (2013.01); *B60W 2710/081* (2013.01); *B60W 2720/403* (2013.01); *B60W 2720/406* (2013.01); *B60Y 2200/92* (2013.01)

(58) Field of Classification Search
CPC ..... B60W 2520/263; B60W 2720/403; B60W 2710/081; B60W 2710/027; B60W 2540/18; B60W 2540/10; B60W 2510/081; B60K 6/48; B60K 6/52; B60Y 2200/92
See application file for complete search history.

(56) References Cited

U.S. PATENT DOCUMENTS

| | | |
|---|---|---|
| 2010/0094519 A1 | 4/2010 | Quehenberger et al. |
| 2010/0108417 A1 | 5/2010 | Gilmore |
| 2011/0172863 A1 | 7/2011 | Yu et al. |
| 2012/0143426 A1* | 6/2012 | Yamamoto ............ B60K 6/448 701/22 |
| 2013/0281247 A1 | 10/2013 | Holmes |
| 2014/0296028 A1 | 10/2014 | Joeng |
| 2015/0038286 A1 | 2/2015 | Hane |

FOREIGN PATENT DOCUMENTS

| | | |
|---|---|---|
| DE | 10 2008 026 662 A1 | 12/2009 |
| DE | 10 2009 005 378 A1 | 4/2010 |
| DE | 10 2013 219 085 A1 | 3/2015 |
| DE | 10 2014 200 427 A1 | 7/2015 |
| DE | 10 2014 221 055 A1 | 4/2016 |
| EP | 2839983 A1 | 2/2015 |

OTHER PUBLICATIONS

Fischer, Pfau, Braun et al.: xDrive Der Neue Allradantrieb im BMW X3 und BMW X5 in ATZ Automobiltechnische Zeitschrift, (2004) 106, 92.

* cited by examiner

DRIVELINE TORQUE CONTROL

CROSS-REFERENCE TO RELATED APPLICATIONS

This application is a national stage of, and claims priority to, Patent Cooperation Treaty Application No. PCT/EP2016/076348, filed on Nov. 2, 2016, which application claims priority to German Application No. DE 10 2015 118 759.0, filed on Nov. 2, 2015, which applications are hereby incorporated herein by reference in their entireties.

There are prior art motor vehicles which comprise a first driveline with a first driving source for driving a first drive axle, as well as a second driveline with a second driving source for driving a second drive axle. The driving sources can differ from one another, for example one of the two driving sources can be configured as an internal combustion engine and the other one as an electric machine. Such drive concepts are also referred to as "hybrid drives". The electric machine and the internal combustion engine are able to drive either each one on its own or they can, in a superimposed condition, drive the motor vehicle jointly.

Normally, the electric machine is followed in the power path by a transmission which translates a rotational movement generated by the electric machine from high speed to low speed and divides the rotational movement amongst two sideshafts.

Such transmissions for electrically driven drive axles can comprise a disconnect system for optionally disconnecting the electric machine from the wheels at higher speeds. This allows a favourable design of the electric machine in respect of traction and friction losses are reduced at higher vehicle speeds.

From DE 101 35 436 A1 a driveline with an internal combustion engine as primary drive and an electric motor as secondary drive is known. In the secondary drive an electro-magnetic clutch is provided which is arranged in the power path between the electric motor and the axle differential. Depending on the respective requirements, the power output of the electric motor can be varied within a range of up to 12 kW, with the electric motor being controlled by an electronic control unit (ECU). Also, the electro-magnetic clutch is engaged and disengaged by the ECU which controls the supply of power to the electro-magnet of the electro-magnetic clutch and the interruption of power.

US 2005 0003923 A1 proposes a motor vehicle having an internal combustion engine as the primary drive for driving the front axle and an electric motor as the secondary drive for driving the rear axle. Between the reduction stage and the differential there is arranged a friction clutch for connecting and disconnecting the rear axle drive.

From US 2010/0094519 A1 a four wheel driveline of a motor vehicle is known with an optionally drivable rear axle. The torque distribution between the front axle and the rear axle takes place via a transfer case with a friction plate clutch controllable by an electronic control unit, and a propeller shaft. A similar four wheel driveline is known from G. Fischer et al, "xDrive, the new four wheel drive in the BMW X3 and BMW X5", ATZ 2/2004, volume 106.

DE 10 2013 219 085 A1 proposes a method and a control device for operating a hybrid vehicle. The hybrid vehicle comprises a first electric motor as the primary motor and an internal combustion engine as the secondary motor, wherein a second electric motor is provided for starting the internal combustion engine. In a first operating mode, the hybrid vehicle can be operated entirely electrically by the primary motor. In a second operating mode, the internal combustion engine for the primary motor can optionally be switched on or off. From DE 10 2014 200 427 A1 there is known a further method and a control device for operating a hybrid vehicle.

DE 10 2014 221 055 A1 proposes a motor vehicle having a first driving machine in the form of an internal combustion engine for driving a first drive axle and a second driving machine in the form of an electric motor for driving a second drive axle. There is provided a drive control device which controls the first and the second driving machine as a function of the target torque which is the controlled variable, wherein the driving torque data are converted into suitable control signals for operating the first and the second driving machine.

From DE 10 2008 026 662 A1 a method of controlling a viscous coupling in the driveline of a motor vehicle is known. The driveline comprises a first drive axle and a second drive axle which are drivingly connectable to one another via the viscous coupling. There is provided an actuating unit for actuating the viscous coupling depending on a speed difference between the speed of the first coupling part and the speed of the second coupling part.

In the case of prior art electric drivelines a sudden torque increase can lead to undesirable rotational vibrations in the driveline, which can adversely affect driving comfort.

From EP 2 839 983 A1 a control device for an electric vehicle and a method of controlling the electric vehicle are known. The control device comprises a pre-control calculation unit for determining a first target torque parameter, and a motor torque control unit which controls the motor torque depending on the first target torque variable. The purpose of the pre-control calculation unit is to improve the stability of the control system and to reduce the inclination towards vibrations in the driveline.

SUMMARY

The present disclosure relates to a method of controlling the driving torque and the driving speed in the driveline of a motor vehicle. Furthermore, the disclosure relates to a driveline assembly for carrying out such a method. The method can control the driving torque and the driving rotational speed of a motor vehicle by torque peaks, and rotational vibrations in the driveline can be avoided. Further disclosed is a driveline assembly by which such a control method can be carried out.

Provided herein is a method of controlling the driving torque and the driving speed of a driveline assembly of a motor vehicle, wherein the driveline assembly comprises a first driveline and a second driveline which are mechanically separated from one another, wherein the first driveline comprises a first drive axle drivable by a first drive unit with an axle differential, and wherein the second driveline comprises an electric machine and a second drive axle with at least one controllable clutch, with the following process steps: monitoring a rotational speed of the first drive axle; monitoring a rotational speed of the second drive axle; determining a target rotational speed for the electric machine for driving the second drive axle, wherein at least one of the rotational speeds of the first drive axle and of the second drive axle is used for determining the target rotational speed of the electric machine; controlling the electric machine in a target speed mode as a function of at least one of the rotational speeds of the first drive axle and of the second drive axle; determining a target torque for driving the second drive axle, wherein at least the rotational speeds of the first drive axle and of the second drive axle are used for determining the target torque; controlling the at least one clutch in a target torque mode as a function of the rotational speed of the first drive axle and of the rotational speed of the second drive axle, wherein a torque transmittable by the clutch is variably adjustable in accordance with the determined target torque; controlling the at least one clutch in a target torque mode as a function of the rotational speed of the first drive axle and of the rotational speed of the second drive axle.

A feature thus is that the electric machine is controlled depending on at least one of the rotational speed of the first drive axle and/or of the rotational speed of the second drive axle and that the clutch is controlled in a target torque mode depending on at least the rotational speed of the first drive axle and of the rotational speed of the second drive axle. In this case the torque transmittable by the controllable clutch is continuously variably adjustable according to the determined target torque. "Target speed mode" in the context of control technology means that the speed of the electric machine constitutes the set point (target value) to be set for controlling the electric machine. Depending on the driving condition of the motor vehicle, a rotational speed required for controlling the driving dynamics of the electric machine is determined, and the electric machine is set and/or controlled according to said rotational speed. The target speed is determined on the basis of at least the speed of the first drive axle and/or of the speed of the second drive axle, and it is to be understood that further input parameters can be taken into account when determining the target speed. For example, the target speed can be determined by an electronic control unit (ECU) which is controllingly connected to the electric machine.

Target torque mode in the context of control technology means that the torque constitutes the guide parameter (target value) to be set for controlling the at least one clutch. Depending on the driving condition of the motor vehicle, the clutch torque required for controlling the driving dynamics is determined and the clutch is set and controlled according to said target torque. The target torque is determined on the basis of at least the speed of the first drive axle and/or the speed of the second drive axle. However, it is understood that further input parameters can be taken into account for determining the target torque. For example, the target torque can be calculated by an electronic control unit (ECU) which is controllingly connected to the clutch. The electric machine and the at least one clutch can be controlled by the same control unit or by different control units.

An advantage of the speed control of the electric machine is that there are further possibilities of controlling the driving dynamics of the motor vehicle. For example, in certain driving situations, the speed of the electric machine can be controlled such that, in comparison with the actual speed of the first drive axle, an increased speed for driving the second drive axle is made available. In other words, the electric machine can be controlled such that it behaves like a propeller shaft with a predetermined speed. As is known from wheel drive concepts with a propeller shaft, setting the torque can then be effected by suitably controlling the torque of the at least one clutch.

MOM "At least one clutch" means that the second driveline can comprise one, two or more clutches. The features of the at least one clutch described in the context of the present disclosure can also apply to a further clutch in the second driveline. However, it is understood that the further clutch can also be configured differently from the at least one clutch.

The at least one clutch, briefly also referred to as a or the clutch, can be provided in the form of a friction clutch which is characterised in that the torque transmittable between the clutch input part and the clutch output part can be set so as to be continuously variable; an example for a friction coupling is a multi-plate clutch. The torque of the friction clutch is controlled by the electronic control unit.

It is possible that the two drivelines are mechanically separated from one another. This means in particular that the first driveline and the second driveline are formed separately from one another and that there is no force-transmitting member between the two drivelines. The first driving source serves only for driving the first driveline and the first drive axle respectively, whereas the electric machine serves only for driving the second driveline and the second drive axle respectively. More particularly, the first drive axle can be configured as the front axle of the motor vehicle and the second drive axle as the rear axle.

Furthermore, it is possible that the speed of the first drive axle and/or the speed of the second drive axle are/is monitored. This can be achieved in that a signal representing the speed of the respective drive axle is measured. For example, one or several of the following parameters can be sensed: the speed of the differential carrier of the first drive axle and/or the speeds of the wheels of the first drive axle and/or the speed of a drive element of the second drive axle and/or the speeds of the wheels of the second drive axle. It is possible in particular that the speed control of the electric machine and the torque control of the clutch is effected on the basis of a determined speed differential between the first drive axle and the second drive axle. For this, the speed of the axle differential of the first drive axle can be compared with the speed of at least one of the wheels of the second drive axle for example. The speed of the axle differential can be determined by a sensor or, if an open differential is used, also on the basis of the speeds of the respective sideshafts and of the associated wheels respectively.

One or several method embodiments and operating modes respectively can be used for controlling the electric machine and the at least one clutch are possible, i.e., a driving dynamics mode, a recuperating mode and/or a gliding mode.

Controlling the driving dynamics of the motor vehicle is particularly important when curves are negotiated, with the vehicle speed also playing a decisive role. As a further step it can thus be possible that a performance parameter which is representative of the steering angle of the wheels of the motor vehicle is monitored and that a corresponding steering signal is generated. The steering signal can then be used for setting the target speed of the electric machine and/or the target torque of the clutch in order to influence the driving dynamics of the motor vehicle.

More particularly, it is possible according to a method embodiment that the electric machine is switched on when the motor vehicle negotiates curves, wherein the target speed of the electric machine is then preferably set such that the second drive axle is drivable at a higher speed than the first drive axle. In one embodiment, the target speed of the electric machine can be set as a function of the steering signal, wherein it is possible that the target speed of the electric machine is the higher the greater the steering angle of the motor vehicle.

Under different driving conditions, the electric machine can also be controlled in a different way. For example, the electric machine can also be switched on in the overrun mode when a curve is negotiated, and/or when, in curves, the motor vehicle changes from the drive mode to the overrun mode. In concrete terms, the target speed of the electric machine can then be set such that the second drive axle is drivable at a lower speed than the first drive axle. In this way, by closing the clutch a negative torque can be applied to the second axle and respectively to a sideshaft. The second drive axle is thus braked relative to the first drive axle. It is particularly advantageous for driving stability if, during the load change into the overrun mode, the inside wheel of the second drive axle is subjected to a negative torque. It is thus counteracted against any undesirable understeering of the motor vehicle.

According to a further method embodiment, the electric machine can be switched on for driving the motor vehicle if the speed of the first drive axle is higher than the speed of the second drive axle, wherein the target speed of the electric machine can then be set such that the second drive axle can be driven at a greater speed than the first drive axle.

When the vehicle is driving straight ahead and/or at higher speeds such as they occur under cross-country conditions and on motorways, the electric machine can be switched off and the at least one clutch can be opened to avoid any drag moments.

According to a further method embodiment it is possible that a transverse acceleration parameter representative of the transverse acceleration of the motor vehicle is monitored, wherein the transverse acceleration signal can be used for determining the target speed of the electric machine and/or the target torque of the clutch.

There can be provided a further step in that an accelerator pedal parameter representative of the position of the accelerator pedal is monitored, and an accelerator signal being generated, wherein the accelerator pedal signal can be used for determining the target speed of the electric machine and/or the target torque of the clutch.

As a further step it can be provided that wheel speed parameters representative of the wheel speeds of the motor vehicle are monitored and wheel speed signals are generated therefrom, wherein the wheel speed signals can be used for determining the target speed of the electric machine and/or the target torque of the clutch.

It is understood that individual, several or all said method steps can be carried out. This means that the steering signal, the transverse acceleration signal, the motor signal and/or the wheel speed signals can be used for controlling the speed of the electric machine, either individually or in combination with one another. The same applies accordingly for controlling the torque of the at least one clutch. It is also possible to measure further parameters and use same for determining the target speed of the electric machine and/or the target torque of the clutch, such as the longitudinal acceleration, the position of the accelerator pedal, the yaw rate of the motor vehicle and/or further signals.

According to a further operating mode which can also be referred to as the recuperating mode, the at least one clutch can be closed when the vehicle is operating in the overrun mode. Overrun mode in this context refers to a driving situation in which the driving source of the first drive axle and/or electric machine are/is dragged (pushed) by the motor vehicle. In this way, the electric machine is driven by the wheels of the second drive axle and operates in the generator mode. In this way, the electric machine converts the mechanical energy introduced by the drive axle into electric energy which can be stored in a battery connected to the electric machine.

According to a further operating mode which can also be referred to as gliding mode, the at least one clutch can be opened when the vehicle is operated in the gliding mode, so that the electric machine is disconnected from the wheels of the second driveline. The term "gliding" in the present disclosure is to include the function that, while the vehicle is being driven, the primary driving source (internal combustion engine) is disconnected from the first driveline without the vehicle being braked. During vehicle gliding, the electric machine can also be disconnected from the second driveline, which is achieved by opening the at least one clutch. When the vehicle travels in the gliding mode, the first driving source (internal combustion engine) and/or the second driving source (electric machine) can be disconnected. This is advantageous in that the existing movement energy is used for moving purposes instead of losing same in the form of drag power. However, it is also possible that the primary drive source is left idling.

An exemplary driveline assembly for a motor vehicle comprises: a first driveline having an axle differential and two sideshafts, wherein the first driveline is rotatingly drivable by a first drive unit; a second driveline having an electric machine and a torque distributing unit with at least one clutch, wherein the torque distributing unit is rotatingly drivable by the electric machine and is configured to distribute a torque introduced by the electric machine to two sideshafts; wherein the first driveline and the second driveline are mechanically separated from one another; first sensor means for determining a first speed of the first driveline; second sensor means for determining the second speed of the second driveline; a control unit for controlling the electric machine and the at least one clutch; wherein the control unit is configured to carry out the above-mentioned method according to one or several of the above-mentioned embodiments.

The driveline assembly provides the same advantages as the exemplary method, so that to that extent reference is made to the above description. It is understood that all the method-related features can be transferred to the product, and vice versa, all product-related features can be transferred to the method. Because the control unit is configured for controlling the speed of the electric machine and for controlling the torque of the at least one clutch, the driving dynamics of the motor vehicle can be controlled easily and reliably, wherein undesirable rotational vibrations in the electric driveline can be prevented or at least reduced.

According to an embodiment, the clutch is configured such that the transmitted torque can be continuously variably set between an open position in which no torque is transmitted and a closed position in which a full torque is transmitted. For this, the clutch is provided in particular in the form of a friction clutch, preferably in the form of a multi-plate friction clutch.

It is possible that the second driveline comprises a transmission unit which splits a torque introduced by the electric machine between two output parts. According to a first possibility, the transmission unit can comprise an axle differential which comprises a differential carrier drivable by the electric machine, a differential gear set and two sideshaft gears as output parts. In this embodiment, only one single clutch can be provided. The clutch can be arranged in the power path between one of the two sideshaft gears and the respective sideshaft, or it can be arranged between the electric machine and the differential carrier (booster).

According to a second possibility, the transmission unit can be configured without a differential function between the output parts, which means that the two output parts of the transmission unit rotate jointly. In this embodiment preferably two clutches are provided, wherein, with the two clutches are arranged in particular between the electric machine and an associated sideshaft. (Twinster)

It applies to both possibilities that the transmission is configured as single speed transmission, i.e., with a fixed transmission ratio between the transmission input and the transmission output.

Alternatively, the transmission can also comprise a controllable transmission stage by which the speed introduced by the electric machine can be converted into different output speeds. Such a transmission with a plurality of gears is also referred to as manual transmission.

SUMMARY OF THE DRAWINGS

Example embodiments will be described below with reference to the drawings wherein.

DESCRIPTION

Figure 1:
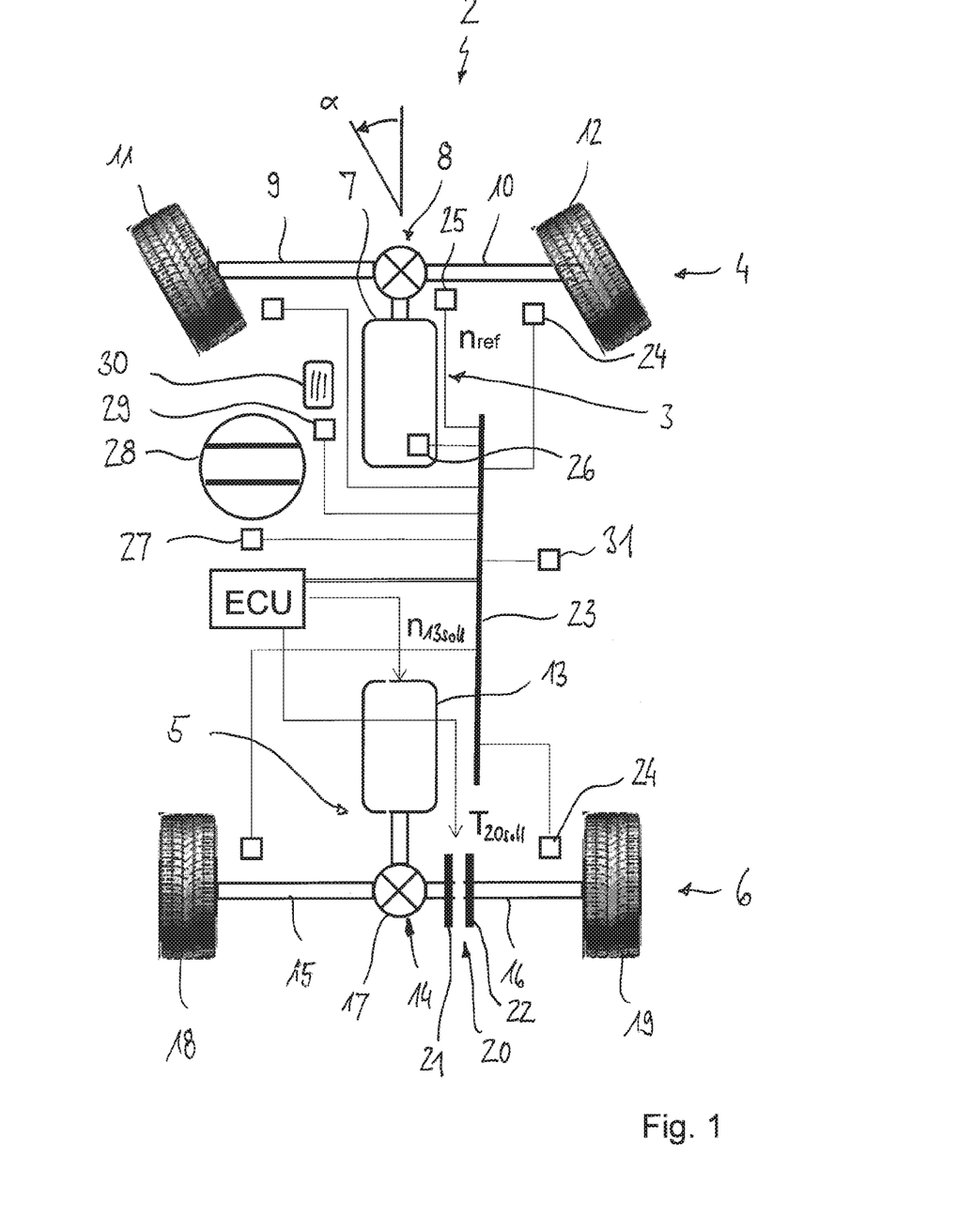
FIG. 1 shows diagrammatically a driveline assembly of a motor vehicle having electric and electronic components for controlling the drive in a first embodiment.
Figure 2:
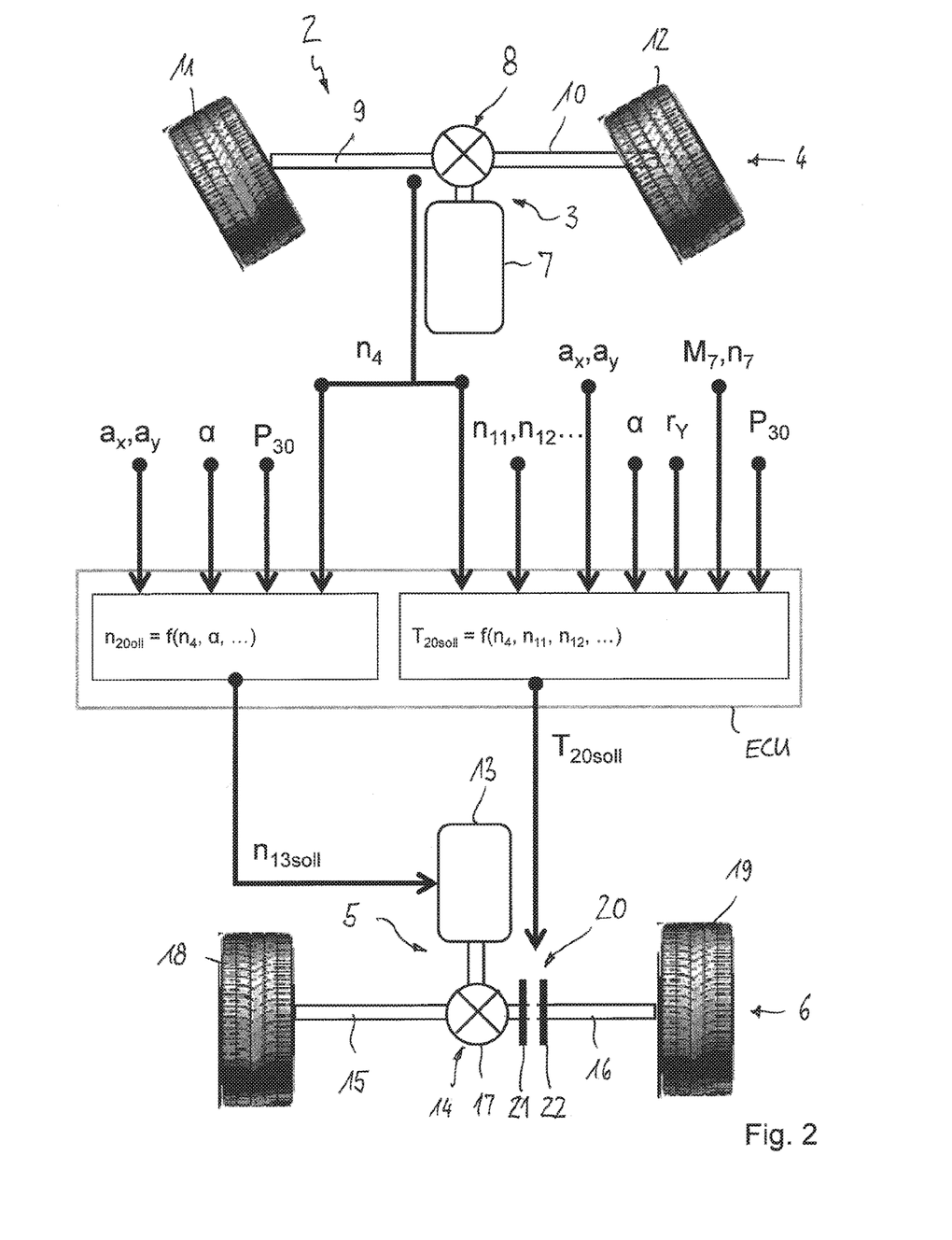
FIG. 2 is a diagrammatic illustration of input and output parameters for controlling the electric machine and the clutches of the driveline assembly according to FIG. 1.

FIGS. 1 and 2, which will be described jointly below, show a mechanical driveline assembly 2 of a motor vehicle. The driveline assembly 2 comprises a first driveline 3 with a first drive axle 4 and a second driveline 5 with a second drive axle 6.

The first driveline 3 is drivable by a first driving unit 7 which is configured, e.g., as an internal combustion engine, with a different driving source such as an electric machine also being possible. The first driving unit 7 can be followed by a manual transmission in which the motor torque is converted into a driving torque, with the motor speed being converted into a driving speed. The second driveline 5 is drivable by a second driving unit 13 which is provided in the form of an electric machine.

It can be seen that the first drive axle 3 is the front axle and that the second drive axle 6 forms the rear axle of the motor vehicle, with a reverse arrangement also being possible. The two drivelines 3, 5 are mechanically separated from each another, i.e., no transmission of power is possible between the two drivelines. The first driving unit 3 serves only for driving the first drive axle 5, whereas the electric machine serves only to drive the second drive axle 6.

The first drive axle 3 comprises an axle differential 8 which distributes the introduced driving torque to the right and the left sideshaft 9, 10 of the motor vehicle. The two sideshafts 9, 10, at their transmission facing ends and at their wheel facing ends each comprise a constant velocity joint (not shown) permitting a transmission of torque to the wheels 11, 12 of the motor vehicle under an angular movement.

The second drive axle 6 comprises an axle differential 14 which uniformly distributes the driving torque introduced by the electric machine between the right and left sideshaft 15, 16 of the second drive axle. The axle differential 14 comprises a differential carrier 17 which is rotatingly drivable by the electric machine 13 around a rotational axis, a plurality of differential gears which rotate jointly with the differential carrier 17 around the rotational axis, as well as two sideshaft gears which engage the differential gear and serve as output parts. The sideshaft gears are connected to the respective sideshaft 15, 16 for transmitting torque. At their outer ends, the two sideshafts 15, 16 are connected to the wheels 18, 19 of the second drive axle 6.

In the present embodiment, a controllable clutch 20 is provided in the second driveline. A first function of the clutch 20 lies in that it can be used for adjusting the driving torque for driving the second drive axle 6, more particularly variably depending on the determined requirements (target torque). Furthermore, the second drive axle 6 and the electric machine can optionally be connected to or separated from one another. The clutch 20 can be provided in the form of a friction clutch which permits a continuously variable adjusting between the clutch input part 21 and the clutch output part 22. In the closed condition, the sideshaft 16 is connected to the output part of the axle differential 14 for transmitting torque. In the open condition, the sideshaft 16 is mechanically separated from the axle differential 14 so that no torque can be transmitted to the wheels 18, 19. Between the closed condition and the open position, the clutch 20 can be set to any intermediate position, so that, in this way it is possible to adjust and control the torque transmitted to the right and left sideshaft 15, 16.

In the present embodiment, the clutch 20 is arranged in the power path between the axle differential 14 and the right sideshaft 16, and it is to be understood that the clutch could also be arranged between the axle differential 14 and the left sideshaft 15. Alternatively or additionally, a controllable clutch could also be arranged in the power path between the electric machine 13 and the axle differential 14. This embodiment of the driveline having a clutch 20 in the second drive axle 4 is also referred to as a "booster".

The clutch 20, shown diagrammatically only, is operated by an actuating unit (not shown) by means of which an axial force for closing the clutch 20 is applied to friction elements of the clutch.

The actuating unit of the clutch 20 and the electric machine 13 are controlled by an electronic control unit (ECU) which transmits suitable electric control currents via power lines to the clutch 20 and the electric machine 13 respectively. For electrically transmitting signals from and to the control unit (ECU) a serial bus assembly 23 is provided which, for example, can be provided in the form of a CAN (controller area network). Interfaces, protocols and electric switching technique for the transmission of signals on a CAN BUS are known and do not need to be explained further. It is understood that, as an alternative to a bus assembly, also individual wires can be provided between the different electric components of the vehicle and the control unit (ECU).

The control unit (ECU) comprises a program-controlled micro-processor and an electronic storage in which a control program is stored. In accordance with the control program, the micro-processor generates control signals for the actuating unit of the clutch 20 and for the electric machine 13. For generating suitable control signals, the control unit (ECU) depends on information on the different operating parameters of the motor vehicle. For this purpose, the control unit (ECU) can access different signals via the bus assembly 23 which are representative for said operating parameters.

In particular, speed sensors 24 are provided that provide information on the speed $n_{11}$, $n_{12}$, $n_{18}$, $n_{19}$ of each wheel 11, 12, 18, 19. The measured speed can be used by the control unit (ECU) to calculate an axle speed $n_4$ of the front axle 4 and/or an axle speed $n_6$ of the rear axle 6. Furthermore, a speed sensor 25 can be provided for monitoring a signal representing the speed n4 of the differential carrier of the first axle differential 8, wherein the speed of the differential carrier n4—if an open differential is used—can also be calculated on the basis of the wheel speeds of the respective wheels 11, 12; 18, 19. On the basis of the sensed speeds n11, n12, of the front wheels 11, 12 and/or the speed n4 of the differential carrier, it is possible to detect if one of the front wheels is slipping, in which case, the control unit (ECU) can controllingly intervene in the driving dynamics.

Furthermore, it is possible that the control unit (ECU) uses at least one motor signal which is representative of the provided motor torque M3 and/or the motor speed n3 of the first driving unit 3. The motor signal is transmitted to the bus assembly 23 by a diagrammatically illustrated motor sensor 26. Furthermore, the control unit (ECU) has access to a steering angle signal. The steering angle signal is provided by a rotational angle sensor 27 which detects the rotational position of the steering wheel 28 of the motor vehicle and/or of a steering column carrying the steering wheel. In this case the rotational position of the steering wheel and/or of the steering column is a value for the motor vehicle steering angle $\alpha$, i.e., the angle deviation of the front wheels from driving in a straight line. For simplifying purposes, the steering angle $\alpha$ is drawn in for one wheel only.

A further input signal for the control unit (ECU) can be an accelerator pedal control signal which, by means of an accelerator pedal sensor 29, indicates the position P30 of the accelerator pedal 30 of the motor vehicle. Furthermore, it is possible that the control unit (ECU) can use one or more acceleration signals of the motor vehicle, which is/are representative of the transverse acceleration of the motor vehicle around the vertical axis, and/or the longitudinal acceleration of the motor vehicle. For this purpose, there is symbolically shown an acceleration sensor 31 which is also connected to the control unit (ECU) via the bus assembly 23.

It can also be possible that the control unit (ECU) uses further signals, for instance a gear position signal which records the gear of the manual transmission. Furthermore, the control unit (ECU) can determine the speed of the motor vehicle by known methods.

A special feature of the present control concept is that the electric machine 13 is controlled in a target speed mode as a function of the speed n4 of the first drive axle 4 and/or of the speed n6 of the second drive axle 6, and that the clutch 20 is controlled in a target torque mode as a function of the speed n4 of the first drive axle 4 and of the speed n6 of the second drive axle 6. In this connection the speed n4, n6 can also be referred to as the reference speed nref. The speed control of the electric machine 13 can thus be effected independently of further input parameters, on the basis of three possibilities, i.e., on the basis of the first speed n4 only, on the basis of the second speed n6 only, or on the basis of the first and the second speed n4, n6. Using only the speed n4 of the first drive axle 4 as an input parameter is advantageous in that it is thereby possible to identity a possible slip at one of the wheels of the primarily driven drive axle 4. Using only the speed n6 of the second drive axle 6 is particularly advantageous if the electric machine 13 has not or has not yet been connected so that the associated wheels of the secondary driven drive axle 6 are slip-free. By using both speeds n4, n6, both advantages are combined, if required.

For controlling the driving speed n13 of the electric machine 13, at least the speed n4 of the first drive axle 4 and, respectively, the speed n6 of the second drive axle 6 are monitored, which speed serves as input parameter for the control unit (ECU) for determining the target speed n13_soll_ for the electric machine 13. For controlling the clutch 20, at least the speeds n4, n6 of the first and the second drive axle 4, 6 are monitored and serve as input parameters for determining the target torque T20_soll_ for driving the second drive axle 6. It is possible that the speed control of the electric machine 13 and the torque control of the clutch 20 take place on the basis of a determined speed differential between the first driving axle 4 and the second driving axle 6. For this purpose, it is possible for example to compare the sensed speed n4 of the differential carrier of the first drive axle 4 or a calculated speed of the first drive axle 4 with the speed n18, n19 of at least one of the wheels 18, 19 of the second drive axle 6.

Controlling the second driveline, respectively of the electric machine 13 and of the clutch 20, can be effected depending on the driving condition of the motor vehicle. In this regard in particular three different control modes are possible, i.e. a driving dynamics mode, a recuperating mode and/or a gliding mode.

In the driving dynamics mode a steering parameter representative of the steering angle $\alpha$ of the wheels 11, 12 of the motor vehicle can be monitored by the sensor 27 and a corresponding steering signal can be generated. The steering signal is an input parameter for the control unit (ECU) and is used for determining the target speed n13_soll_ of the electric machine 13 and/or of the target torque T20_soll_ of the clutch 20 for influencing the driving dynamics of the motor vehicle. As can be seen in FIG. 2, further input parameters such as acceleration parameters for the transverse acceleration, longitudinal acceleration and/or the yaw rate of the motor vehicle as well as a parameter representative of the position of the accelerator pedal 30 can be taken into account.

The electric machine 13 can be switched on in particular when the motor vehicle is negotiating curves, which increases the driving stability and improves driving dynamics. It is possible in particular that the second drive axle 6 is drivable at a higher speed n6 than the actual speed n4 of the first drive axle. In other words, the speed of the electric machine 13 is specifically set as if the second driveline 5 was or should be geared up relative to the first driveline 3, which is also referred to as speed offset. The magnitude of the speed difference between the speed n4 of the first drive axle 4 and the speed n6 of the second drive axle 6 achievable with a closed clutch 20 can be adjusted depending on the steering angle $\alpha$ of the motor vehicle. In this case, the target speed n13_soll_ of the electric machine 13 can be set in particular to be the higher the greater the steering angle $\alpha$ of the motor vehicle. Furthermore, the magnitude of the speed difference can also be set as a function of the absolute vehicle speed, for example, it can be the greater the higher the speed of the motor vehicle.

The driving torque at the second drive axle 6 can be set entirely by the clutch 20; i.e., by means of the clutch 20, the speed n13 made available by the electric 13 machine is converted into a driving torque for driving the second drive axle 6. By correspondingly controlling the clutch 20, the magnitude of the driving torque can be continuously adjusted specifically to the required value. As can be seen in particular in FIG. 2, the magnitude of the required clutch torque T20_soll_ to be transmitted can be determined as a function of the speeds n11, n12, n18, n19 of the front and rear wheels 11, 12, 18, 19, of the speed n4 of the differential carrier of the first axle differential 8, of the steering angle $\alpha$ of the motor vehicle, of the acceleration parameters for the transverse acceleration ay, of the longitudinal acceleration ax and/or of the yaw rate ry of the motor vehicle, the position value P30 of the accelerator pedal 30, and of the motor parameters of the first drive unit 3, such as the motor torque M3 and the motor speed n3. It is to be understood that further parameters such as the absolute vehicle speed and the transmission signal, which indicates the gear set by the first manual transmission can also be used for determining the target clutch torque T20$soll$.

When the vehicle is driving straight ahead and/or at higher vehicle speeds, for instance under cross-country and motorway conditions, the electric machine 13 can be switched off and the controllable clutch can be opened to avoid any drag torque.

The recuperating mode can be used when the vehicle is driven in the overrun mode, i.e., when the accelerator is released and when the first driveline 3 (at least initially) is closed. When the vehicle is driven in the recuperating mode, the clutch 20 is closed so that the electric machine 13 is driven by the wheels 18, 19 of the second drive axle 6. In this case, the electric machine is operated in a generator mode and converts the mechanical energy introduced by the drive axle 6 into electric energy. The electric energy can be stored in a battery (not shown).

Under gliding mode conditions, the clutch 20 can be opened, so that the electric machine 13 is disconnected from the wheels 18, 19 of the second driveline 6. Gliding conditions prevail if, under driving conditions, the first driving unit is disconnected from the first driveline 3 without being braked.

Figure 3:
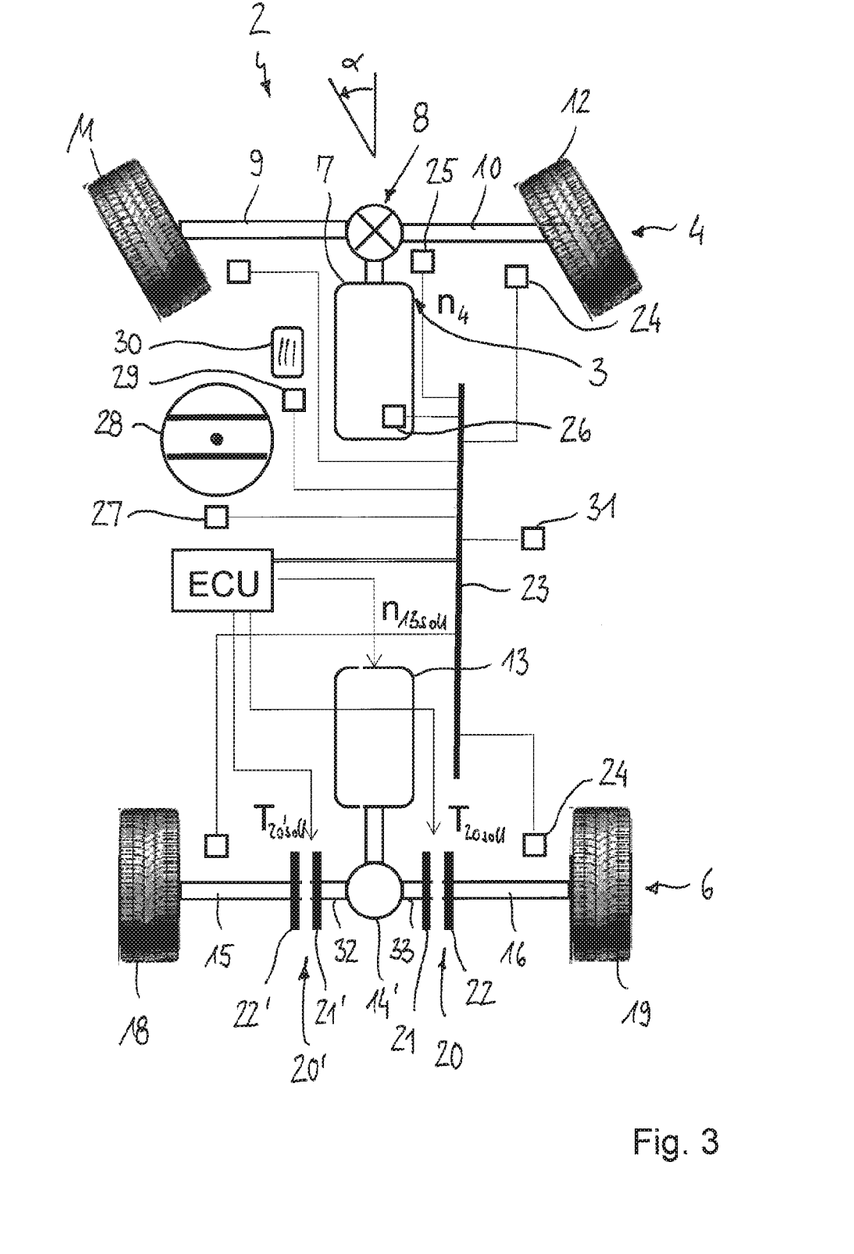
FIG. 3 is a diagrammatic illustration of a motor vehicle having electric and electronic components for controlling the drive in a second embodiment.
Figure 4:
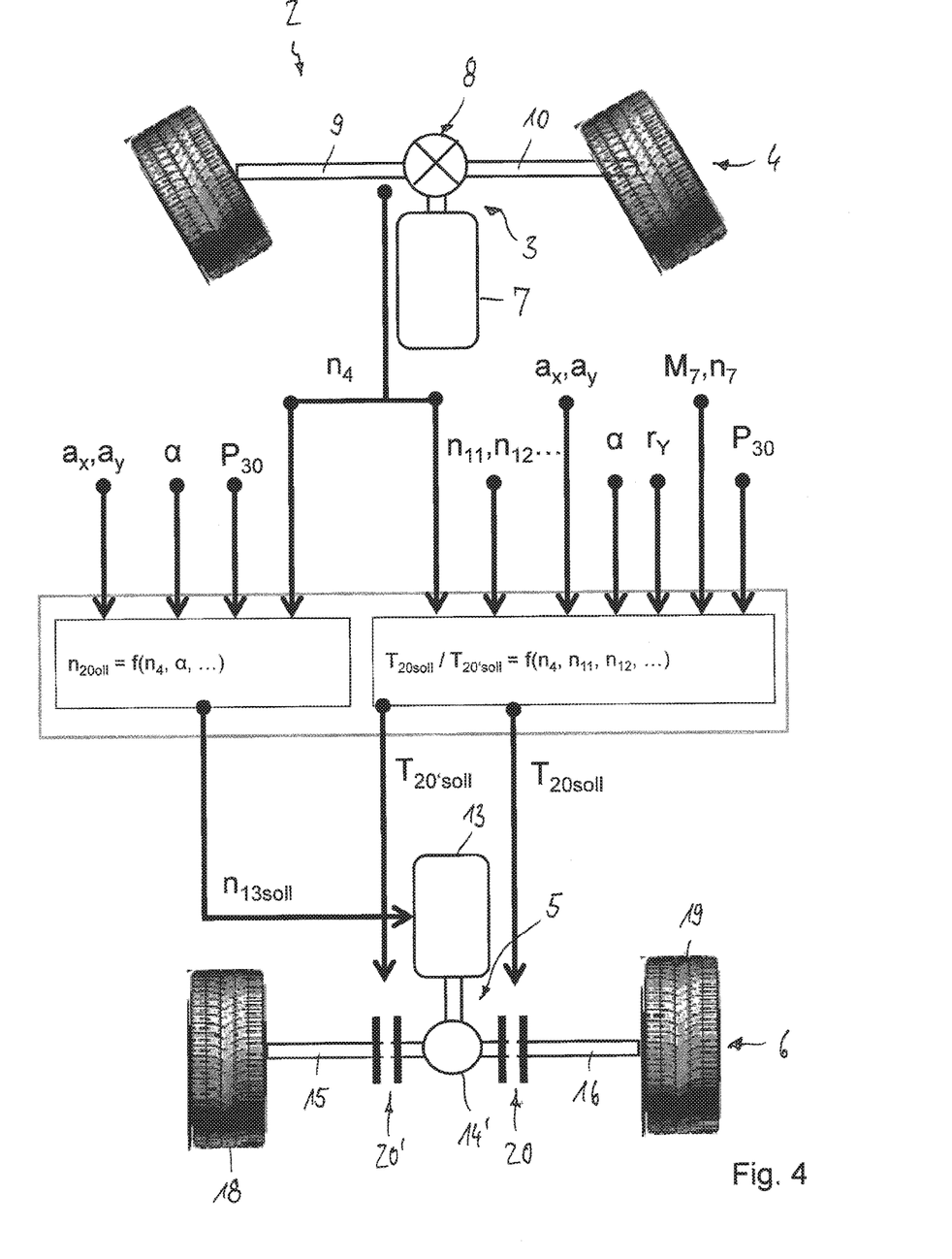
FIG. 4 is a diagrammatic illustration of the input and output parameters for controlling the electric machine and the clutch of the driveline assembly according to FIG. 3.

FIGS. 3 and 4, which will be described jointly below, show an exemplary driveline assembly in a second embodiment. In respect of configuration and mode of operation, the present embodiment corresponds to those of FIGS. 1 and 2, so that as far as common features are concerned, reference is abbreviatingly made to the above description. Identical details or details corresponding to one another are provided with the same reference numbers as in FIGS. 1 and 2.

The only difference refers to the configuration of the second drive axle 6, which will be described below. It can be seen in FIGS. 3 and 4 that the second drive axle comprises two clutches 20, 20' by which the transmission to and distribution between the sideshafts 16, 17 is controlled. The present embodiment does not comprise an axle differential.

The driveline 5 comprises a transmission gearing 14' having an input part rotatingly drivable by the electric machine 13 and two output parts 32, 33 which are drivingly connected to the input part. The two output parts 32, 33 are rigidly connected to one another, so that they rotate at the same speed n6. For setting different driving torques for driving the wheels 18, 19 a clutch 20, 20' is provided per sideshaft which clutches are individually controllable. In respect of functioning, the clutches 20, 20' are configured like the clutch according to the above embodiment to which reference is hereby made to avoid repetition. The clutches 20, 20' are preferably configured identically. The clutch input parts 21, 21' are connected to the respective output part 32, 33 of the transmission 14'. The clutch output parts 22, 22' are connected to the respective sideshaft 15, 16.

In addition to continuously adjusting the driving torque at the second drive axle 6 and the function of disconnecting the driveline, the present embodiment with two clutches 20, 20' comprises a further special feature that the torque distribution between the right side shaft and the left sideshaft 15 can be adjusted and controlled individually. For the purpose, the control unit (ECU) determines a target torque T20$soll$, T20'$soll$ individually for the associated clutch 20, 20'. The present embodiment with a clutch 20, 20' for each sideshaft 15, 16, i.e. a total of two clutches, is also referred to as a "twister".

LIST OF REFERENCE NUMBERS 2 driveline assembly
3 first driveline
4 first drive axle
5 second driveline
6 second drive axle
7 first drive unit
8 axle differential
9 sideshaft
10 sideshaft
11 wheel
12 wheel
13 second drive unit/electric machine
14 axle differential
15 sideshaft
16 sideshaft
17 differential carrier
18 wheel
19 wheel
20,20' clutch
21 clutch input part
22 clutch output part
23 bus system
24 speed sensor
25 speed sensor
26 motor sensor
27 rotary angle sensor
28 steering wheel
29 pedal sensor
30 accelerator pedal
31 acceleration sensor
32 output part
33 output part
α steering angle
ax, ay acceleration
ECU electronic control unit
n rotational speed
nref reference speed
nsoll target rotational speed
ry yaw rate
p pedal signal
torque
Tsoll target torque

The invention claimed is:
1. A method of controlling a driving torque in a driveline assembly of a motor vehicle,
wherein the driveline assembly comprises a first driveline and a second driveline that are mechanically separated from one another,
wherein the first driveline comprises a first drive unit and a first drive axle with an axle differential, and the second driveline comprises an electric machine and a second drive axle with at least one controllable clutch,
the method comprising:
monitoring a rotational speed of the first drive axle;
monitoring a rotational speed of the second drive axle;
determining a target rotational speed for the electric machine for driving the second drive axle, wherein at least one of the rotational speeds of the first drive axle and of the second drive axle is used for determining the target rotational speed of the electric machine;

controlling the electric machine in a target speed mode depending on at least one of the rotational speeds of the first drive axle and of the second drive axle;
determining a target torque for driving the second drive axle, wherein at least the rotational speed of the first drive axle and the rotational speed of the second drive axle are used for determining the target torque;
controlling the at least one clutch in a target torque mode depending on the rotational speed of the first drive axle and of the rotational speed of the second drive axle, wherein a torque transmittable by the clutch is variably adjustable in accordance with the determined target torque.

2. The method of claim 1, further comprising:
monitoring a steering parameter representative of the steering angle (a) of the motor vehicle; and
generating a steering signal;
wherein the steering signal is used for determining at least one out of the group of the target rotational speed of the electric machine and of the target torque of the at least one clutch.

3. The method of claim 2, further comprising:
setting the target rotational speed of the electric machine depending on the steering signal, wherein the target rotational speed of the electric machine is higher the greater the steering angle ($\alpha$) of the motor vehicle.

4. The method of claim 1, further comprising:
actuating the electric machine for driving the motor vehicle when the rotational speed of the first drive axle is greater than the rotational speed of the second drive axle;
wherein the target rotational speed of the electric machine is then set such that the second drive axle is drivable at a higher rotational speed than that of the first drive axle.

5. The method of claim 1, further comprising:
actuating the electric machine for driving the motor vehicle when the motor vehicle is negotiating a curve;
wherein the target rotational speed of the electric machine is set such that the second drive axle is drivable at a higher rotational speed than the rotational speed of the first drive axle.

6. The method of claim 1, further comprising:
actuating the electric machine if the motor vehicle, when negotiating a curve, changes from driving mode to overrun mode;
wherein the target rotational speed of the electric machine is then set such that the second drive axle is drivable at a lower rotational speed than the rotational speed of the first drive axle.

7. The method of claim 1, further comprising:
monitoring a transverse acceleration parameter representative of the transverse acceleration of the motor vehicle, and generating a transverse acceleration signal;
wherein the transverse acceleration signal is used for determining at least one out of the target rotational speed of the electric machine and the target torque of the at least one clutch.

8. The method of claim 1, further comprising:
monitoring a motor parameter representative of at least one of the motor torque and the motor speed of the motor vehicle; and
generating a motor signal;
wherein the motor signal is used for determining at least one of the target rotational speed of the electric machine and the target torque of the at least one clutch.

9. The method of claim 1, further comprising:
monitoring an accelerator pedal parameter representative of the position of the accelerator pedal of the motor vehicle; and
generating an accelerator pedal signal;
wherein the accelerator pedal signal is used for determining at least one out of the group of the target rotational speed of the electric machine and the target torque of the at least one clutch.

10. The method of claim 1, further comprising:
monitoring a wheel speed parameter which is representative of the wheel speeds of the motor vehicle; and
generating wheel speed signals;
wherein the wheel speed signals are used for determining at least one out of the group of target rotational speed of the electric machine and the target torque of the at least one clutch.

11. The method of claim 1, further comprising: controlling the at least one clutch such that the clutch is opened when the motor vehicle is operated in the gliding mode, so that the electric machine is disconnected from the wheels of the second drive axle.

12. A driveline assembly for a motor vehicle, comprising:
a first driveline for driving a first drive axle having an axle differential and two sideshafts, wherein the first driveline is rotatingly drivable by a first drive unit;
a second driveline for driving a second drive axle with an electric machine, a transmission and at least one controllable clutch, wherein the transmission is rotatingly drivable by the electric machine and is configured to distribute a torque introduced by the electric machine to two output parts;
wherein the first driveline and the second driveline are separated from one another mechanically;
first sensor means for determining a first rotational speed of the first drive axle;
second sensor means for determining a second rotational speed of the second drive axle;
an electronic control unit (ECU) for controlling the electric machine and the at least one clutch;
wherein the ECU is configured for
monitoring a rotational speed of the first drive axle;
monitoring a rotational speed of the second drive axle;
determining a target rotational speed for the electric machine for driving the second drive axle, wherein at least one of the rotational speeds of the first drive axle and of the second drive axle is used for determining the target rotational speed of the electric machine;
controlling the electric machine in a target speed mode depending on at least one of the rotational speeds of the first drive axle and of the second drive axle;
determining a target torque for driving the second drive axle, wherein at least the rotational speed of the first drive axle and the rotational speed of the second drive axle are used for determining the target torque;
controlling the at least one clutch in a target torque mode depending on the rotational speed of the first drive axle and of the rotational speed of the second drive axle, wherein a torque transmittable by the clutch is variably adjustable in accordance with the determined target torque.

13. The driveline assembly of claim 12, wherein the at least one clutch can be continuously variably controlled between an open position in which no torque is transmitted and a closed position in which a full torque is transmitted.

14. The driveline assembly of claim 12, wherein the transmission comprises an axle differential with a differential carrier, a plurality of differential gears and two sideshaft gears, wherein the at least one clutch is arranged in a power path between the two sideshaft gears and the associated sideshaft.

15. The driveline assembly of claim 12, wherein the second drive axle comprises two clutches, wherein the two clutches are arranged in a power path between the electric machine and an associated sideshaft.

\* \* \* \* \*

UNITED STATES PATENT AND TRADEMARK OFFICE
CERTIFICATE OF CORRECTION

PATENT NO. : 10,227,070 B2
APPLICATION NO. : 15/771434
DATED : March 12, 2019
INVENTOR(S) : Michael Höck, Harwin Niessen and Juan Manuel Micó Soler Page 1 of 1

It is certified that error appears in the above-identified patent and that said Letters Patent is hereby corrected as shown below:

In the Claims

Column 13, in Line 16, Claim 2: replace "angle (a) of the" with -- angle (α) of the --.

Signed and Sealed this
Seventh Day of May, 2019

Andrei Iancu
*Director of the United States Patent and Trademark Office*